United States Patent [19]

Akeel et al.

[11] Patent Number: 4,659,279

[45] Date of Patent: Apr. 21, 1987

[54] ROBOT WITH IMPROVED CABLE ROUTING AND CLAMPING

[75] Inventors: Hadi A. Akeel, Sterling Heights; William H. Poynter, Mt. Clemens, both of Mich.

[73] Assignee: GMF Robotics Corporation, Troy, Mich.

[21] Appl. No.: 686,086

[22] Filed: Dec. 24, 1984

[51] Int. Cl.[4] .............................................. B25J 11/00
[52] U.S. Cl. ..................................... 414/680; 248/52; 248/68.1; 414/918; 901/15; 901/28
[58] Field of Search ................... 414/680, 735, 730, 4, 414/918; 901/15, 22, 23, 24, 27, 28, 29, 37, 38, 50, 14; 248/52, 681; 24/457, 339, 535

[56] References Cited

U.S. PATENT DOCUMENTS

| 3,954,188 | 5/1976 | Boyle | 414/735 |
| 4,293,265 | 10/1981 | Luck et al. | 414/735 X |
| 4,378,959 | 4/1983 | Susnjara | 414/735 X |

FOREIGN PATENT DOCUMENTS 0069483  1/1983  European Pat. Off. ............. 901/14
859162  1/1961  United Kingdom ................... 414/4

Primary Examiner—Robert J. Spar
Assistant Examiner—Donald W. Underwood
Attorney, Agent, or Firm—Brooks & Kushman

[57] ABSTRACT

A robot comprising a base, an arm assembly and first and second spaced robot parts are mounted on the robot so that the first robot part pivots with respect to the second robot part about a pivotal axis and a ribbon of flexible cables are connected to and extend between the robot parts in a direction substantially normal to and towards the pivotal axis to provide a ribbon of cables which have an effective length between the robot parts which does not change during pivoting. The cables are clamped in spaced apart positions by a directing mechanism and a retainer mechanism so that the effective length does not change and the cables do not rub each other during pivoting. The directing mechanism comprises a weldment including a pair of interconnected holders which direct the cables from an axis parallel to the pivotal axis to the normal direction towards the pivotal axis.

7 Claims, 8 Drawing Figures

ROBOT WITH IMPROVED CABLE ROUTING AND CLAMPING

TECHNICAL FIELD

This invention relates to robots having pivotal parts and, in particular, to electric robots having internally routed electrical cables for servicing the electric motors of the robot.

BACKGROUND ART

The prior art discloses various methods of routing and clamping the cables of a robot including electrical cables and/or cables containing a fluid, such as paint. When such cables are connected to robot parts which are rotatable about a pivotal axis, the cables must be routed and/or clamped to prevent interference and rubbing between the cables and between the cables and the other robot parts. One method that has been employed is to coil the cable or cables so that the cables wind or unwind depending upon the direction of rotation. This method, however, requires additional space to allow the winding and unwinding of the coils of the cable. If such space is not provided, the coils of the cable will rub against the other moving and non-moving parts of the robot, thereby shortening the life of the cables. Also, such cables must be flexible enough to permit such winding and unwinding.

The prior art discloses numerous methods of routing and clamping cables in a robot. These include the U.S. patent to Bock U.S. Pat. No. 2,811,267; the U.S. patent to Stoddard U.S. Pat. No. 2,847,663; the U.S. patent to James U.S. Pat. No. 2,861,700; the U.S. patent to Bergsland et al U.S. Pat. No. 2,861,701; the U.S. patent to Demorest et al U.S. Pat. No. 2,926,627; the U.S. patent to Sullivan U.S. Pat. No. 3,066,805; the U.S. patent to Boretti et al U.S. Pat. No. 3,477,870; the U.S. patent to Dunn U.S. Pat. No. 3,865,525; the U.S. patent to Hill U.S. Pat. No. 3,904,234; the U.S. patent to Abu-Akeel et al U.S. Pat. No. 4,218,166; the U.S. patent to Hedren et al U.S. Pat. No. 4,348,575; and the U.S. patent to Susnjara U.S. Pat. No. 4,378,959.

DISCLOSURE OF THE INVENTION

An object of the present invention is to provide an improved robot including at least one cable, which extends between and is connected to first and second robot parts which are relatively pivotable, wherein the effective length of the cable does not change during pivoting.

Another object of the present invention is to provide a robot including a ribbon of cables which is connected to and extends between first and second robot parts, one of which is relatively pivotable wherein the cables do not rub against each other and the effective length of the cables does not change during pivoting.

In carrying out the above objects and other objects of the present invention, a robot constructed in accordance with the present invention includes a base and an arm assembly having a pivotal connection that pivotally supports the arm assembly on the base. First and second robot parts are mounted on the robot, the first robot part being pivotable with respect to the second robot part about a pivotal axis. At least one flexible cable is connected to the second robot part and extends in a direction substantially normal to and towards the pivotal axis to provide a cable which has an effective length between the robot parts that does not change during pivoting of the first robot part. The cable flexes during pivoting.

Preferably, a plurality of flexible cables are connected to the second robot part at spaced locations to provide a ribbon of cables that do not rub against each other during pivoting of the first robot part and which have an effective length between the robot parts that does not change during pivoting of the first robot part.

The above construction minimizes cable interference with other parts of the robot as well as with each other while, at the same time, providing a compact construction. The above construction also minimizes the amount of bending that the robot cables experience and also increase the projected lifetime of the cables.

Other advantages of the present invention will be readily appreciated as the same become better understood by reference to the following detailed description when considered in connection with the accompanying drawings.

BEST MODE FOR CARRYING OUT THE INVENTION

Figure 1:
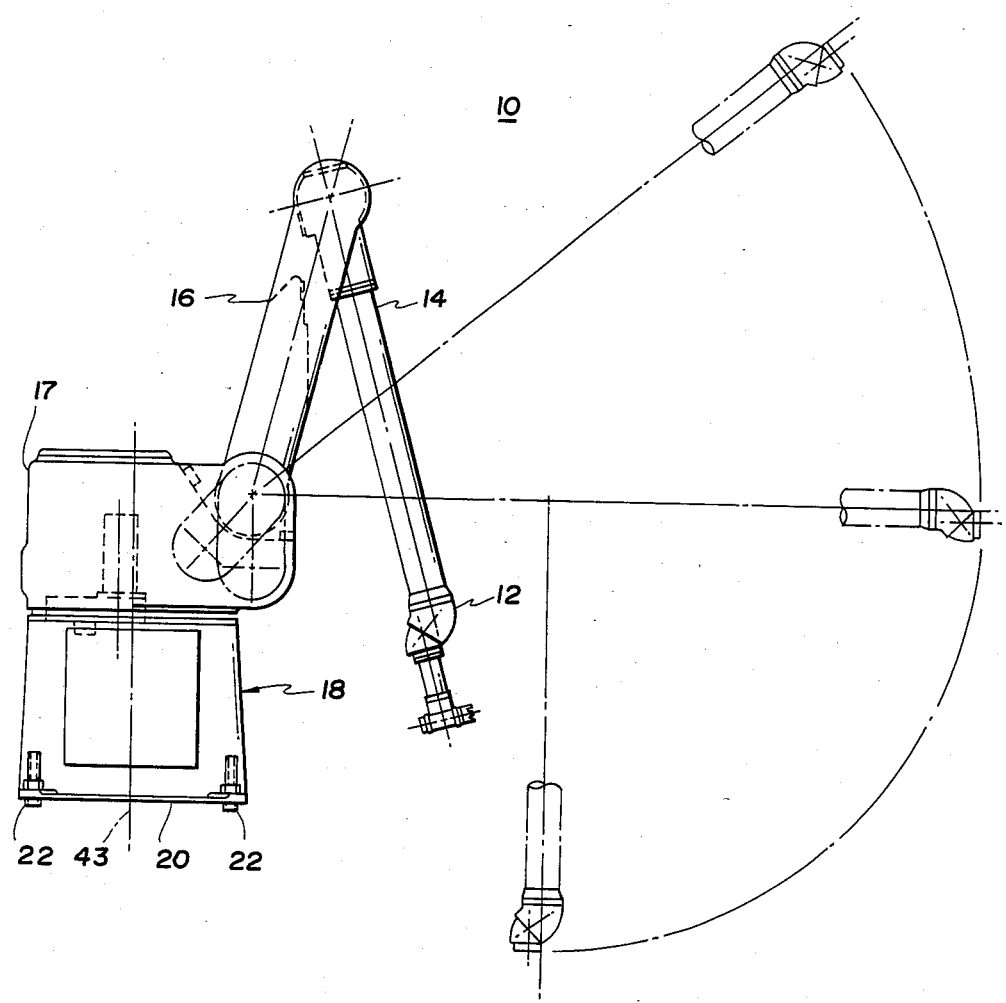
FIG. 1 is a side elevational view of a robot constructed in accordance with the present invention with a work envelope of the robot illustrated in phantom.

Referring to FIG. 1 of the drawings, a robot constructed in accordance with the present invention is collectively indicated by reference numeral 10. The robot 10 preferably comprises a robot having three degrees of freedom constituted by rotary joints. A wrist mechanism 12 may be secured at the free end of an outer arm 14 of the robot 10 to provide an additional three degrees of freedom. The outer arm 14 is pivotally connected to an inner arm 16 which, in turn, is pivotally connected to an upper rotatable section 17 of a base, generally indicated at 18. The base 18 includes a lower non-rotatable section 20, which may be adjustably mounted on a factory floor, such as by leveling bolts 22.

Figure 2:
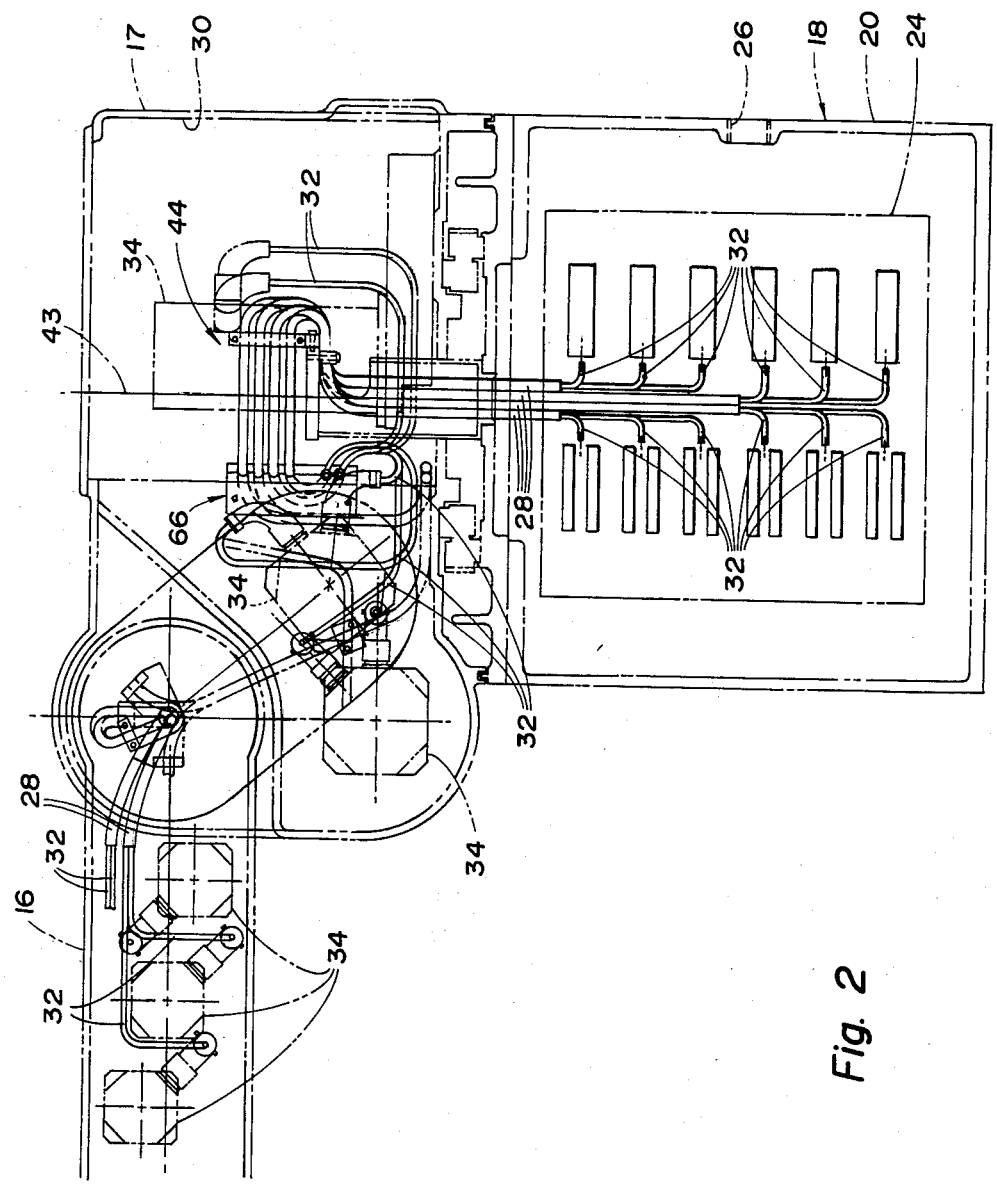
FIG. 2 is a side elevational view, partially broken away, illustrating the routes of the various cables in the robot with many of the robot parts illustrated by phantom lines.

Referring now to FIG. 2, there is illustrated a terminal strip 24 to which an input cable (not shown) is electrically connected. The input cable extends through an opening 26, formed through an outer wall of the lower section 20. The input cable contains all of the electrical wires and cables necessary to provide the motors of the robot 10 with the proper power and control signals from a robot controller (not shown). Additional details of the specific construction and operation of many of the electrical connections are given in co-pending U.S.

patent application entitled "Electric Robot for Use in a Hazardous Location", U.S. Ser. No. 692,996 filed on Jan. 22, 1985, having the same Assignee and which is hereby incorporated by reference.

In the particular embodiment of the invention, four relatively large cables 28 extend upwardly away from the terminal strip 24 and into a compartment 30 formed in the upper section 17. In turn, each of the cables 28 houses three smaller cables 32 extending from the terminal strip 24. Each of the smaller cables 32 carries wires for carrying power signals or control signals for a particular electric motor, such as conventional electric motors 34, three of which are housed in a compartment 30 and three of which are housed in a compartment formed in the inner arm 16. Through appropriate gearing the motors 34 controllably drive the upper section 17, the inner arm 16, the outer arm 14 and the different housing parts of the three-axis wrist mechanism 12.

Figure 3:
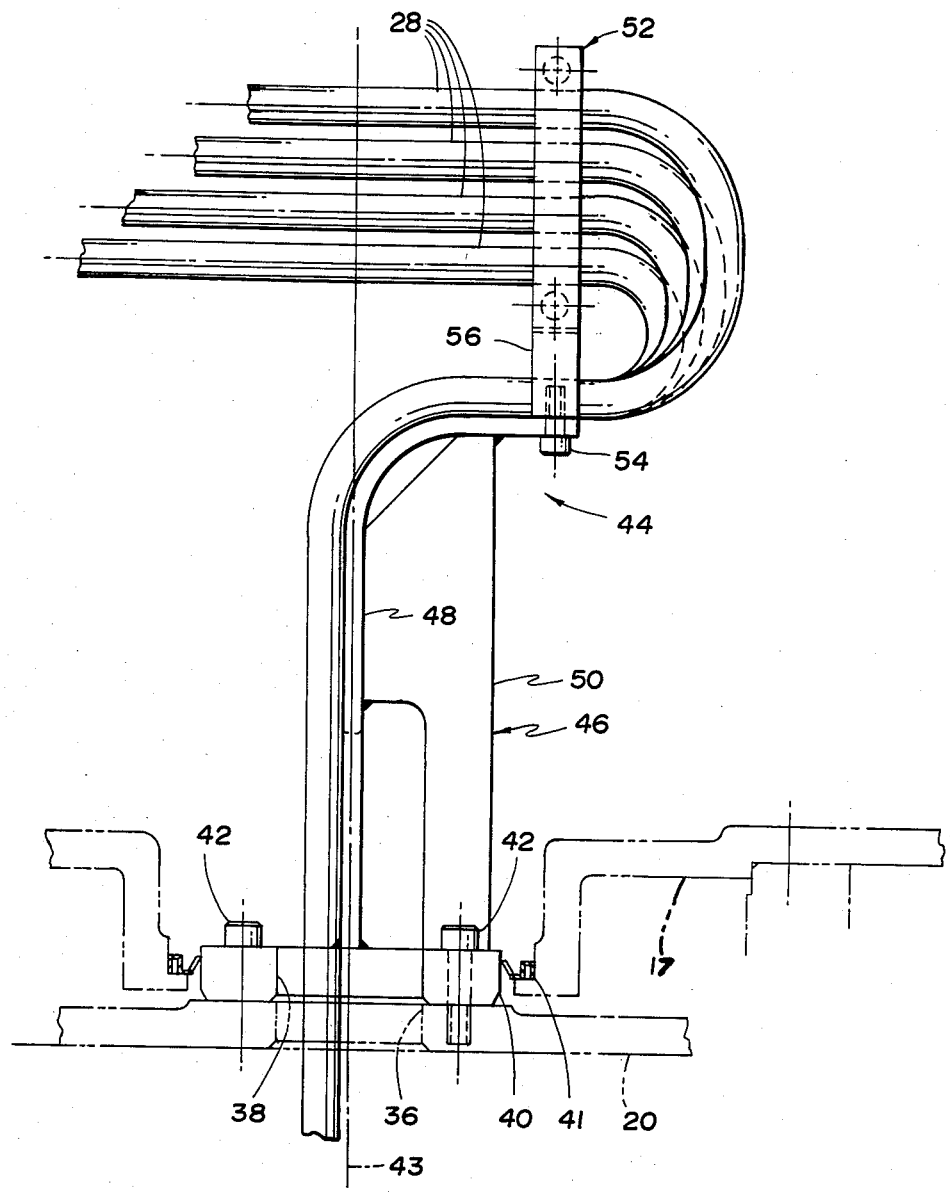
FIG. 3 is an enlarged view, partially broken away, of the cables and a structure for supporting and directing same.
Figure 4:
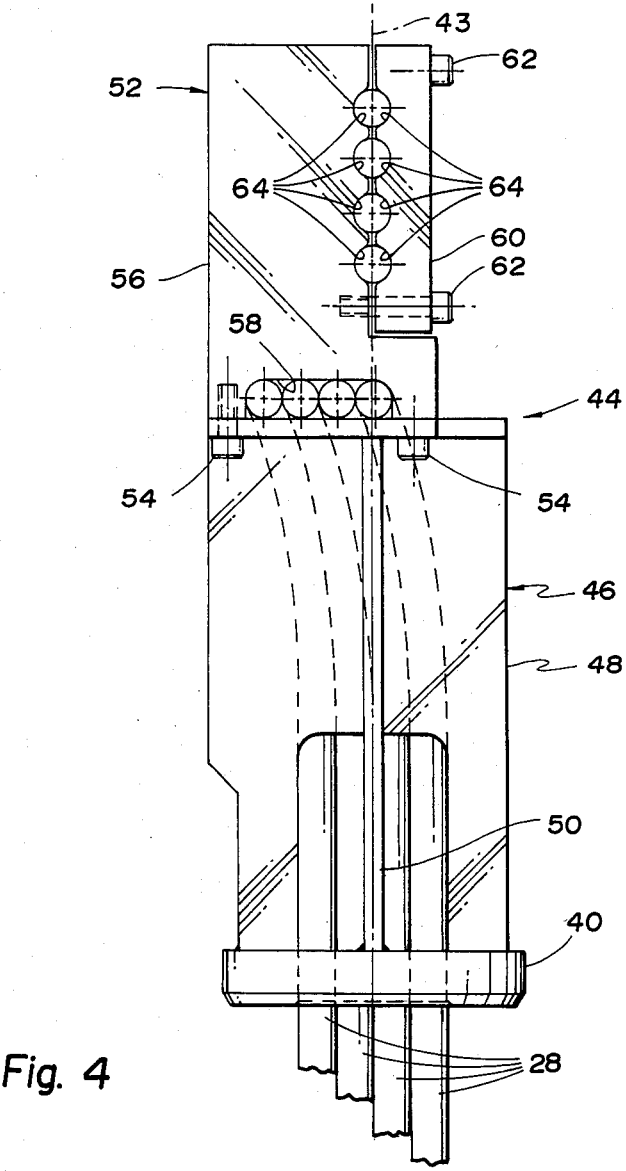
FIG. 4 is a side view, partially broken away, corresponding to the view of FIG. 3.
Figure 5:
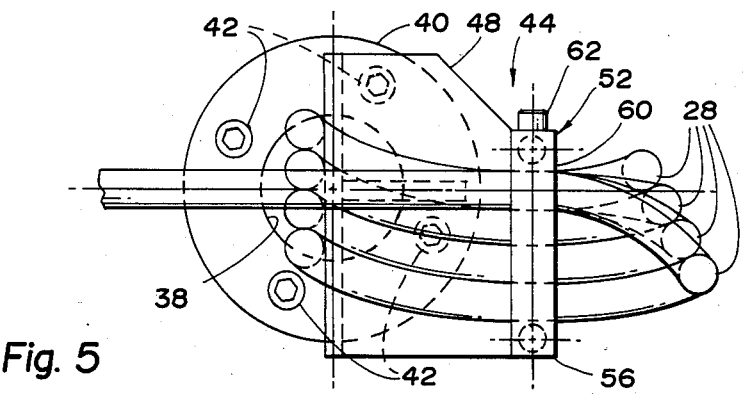
FIG. 5 is a top plan view, partially broken away, corresponding to the view of FIG. 3.

Referring now to FIGS. 3 through 5, the ribbon of cables 28 extend upwardly through an aperture 36 formed through a support plate of the lower section 20 and through an aligned passageway 38 formed through a collar member 40. The collar member 40 is bolted to the drive plate of the lower section 20 by bolts 42.

A circular seal 41 is provided between the collar 40 and the first section 17 to seal the upper compartment 30 while permitting rotative movement of the upper section 17 about a pivotal axis 43.

The cables 28 are supported and directed by a directing means or cable support assembly, generally indicated at 44. The support assembly 44 includes a first lower cable holder which comprises a weldment 46. The weldment 46 includes a vertically extending curved plate 48, which is fixedly secured to the collar 40, such as by welding. The plate 48 is supported by a support plate 50, which is welded not only to the vertical plate 48, but also to the collar 40. The weldment 46 supports the upwardly extending cables 28 and also twists and redirects the cables 28 to extend in a substantially horizontal position immediately adjacent an upper cable holder, generally indicated at 52. The upper cable holder 52 is fixedly mounted at the top horizontally extending portion of the plate 48 by bolts 54. The holder 52 includes an L-shaped plate 56 which has an elongated slot 58 formed at its lower surface to allow the cables 28 to extend therethrough. In this way the cables 28 are clamped between the opposing surfaces of the curved plate 48 and the L-shaped plate 56.

The upper holder 52 also includes a rectangular clamping plate 60 which is mounted to the L-shaped plate 56 by mounting bolts 62. The outer surface of the upper portion of the L-shaped plate 56 and the inner surface of the clamping plate 60 include opposing, complementarily-formed cylindrical grooves 64 for receiving and retaining the cables 28 therein in a spaced relationship to prevent rubbing therebetween. In other words, the holder 52 receives and retains the cables 28 in a single vertical column by redirecting the single row of cables from the slot 58.

Figure 7:
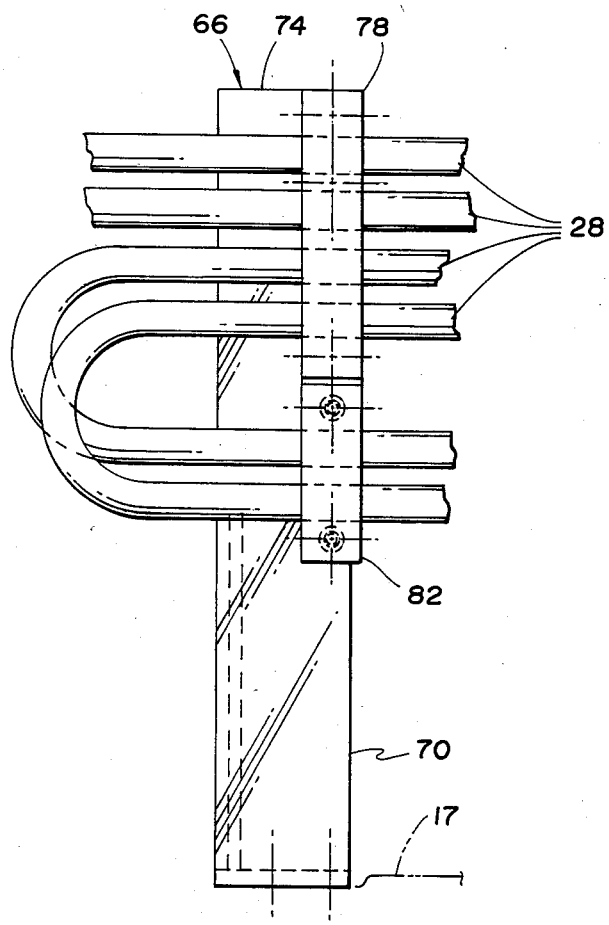
FIG. 7 is a front elevational view, partially broken away, of a retainer mechanism for the cables.
Figure 8:
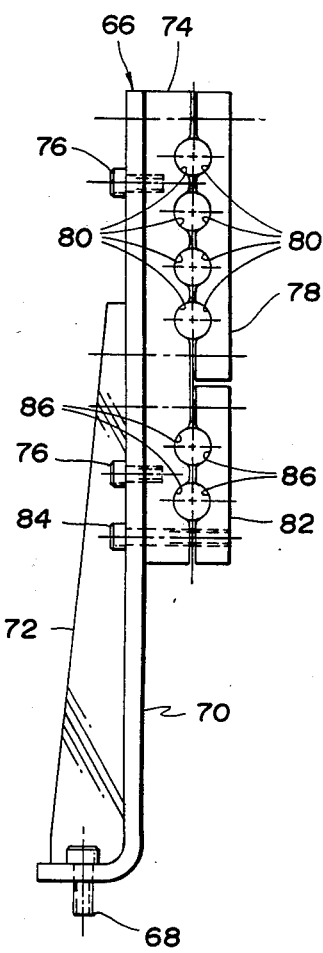
FIG. 8 is a side elevational view of the retainer mechanism of FIG. 7.

Referring now to FIGS. 7 and 8, a retainer means or mechanism, generally indicated at 66, is provided for retaining the spaced-apart cables 28 at a location spaced away from the pivotal axis 43 and the weldment 46. The retainer mechanism 66 is fixedly secured to a lower wall of the upper section 17 by mounting bolts 68 which extend through a bent or flanged portion of a mounting plate 70 of the mechanism 66. The plate 70 is reinforced and supported by a trapezoidal plate 72 welded thereto.

The mechanism 66 also includes a holder plate 74 which is bolted to the plate 70 by mounting bolts 76. In turn, a clamping plate 78 is clamped to the holder plate 74 by bolts (not shown) to clamp the spaced-apart cables 28 therebetween in opposed, complementarily-formed cylindrical grooves 80 in the outer face of the holder plate 74 and the inner face of the clamping plate 78 (i.e. in the same fashion as the grooves 64 in the upper holder 52).

The mechanism 66 also includes a second clamping plate 82 which is secured to the holder plate 74 by bolts 84 for clamping a pair of redirected cables 28 therebetween. The cables 28 are disposed in similar, opposing, complimentarily-formed cylindrical grooves 86 formed in the outer face of the holder plate 74 and the inner face of the clamping plate 82 to thereby clamp the two cables 28 therebetween. In this way, the clamping plate 82 in cooperation with the holder plate 74 redirect a pair of cables 28 while retaining the relative spacing therebetween.

Figure 6:
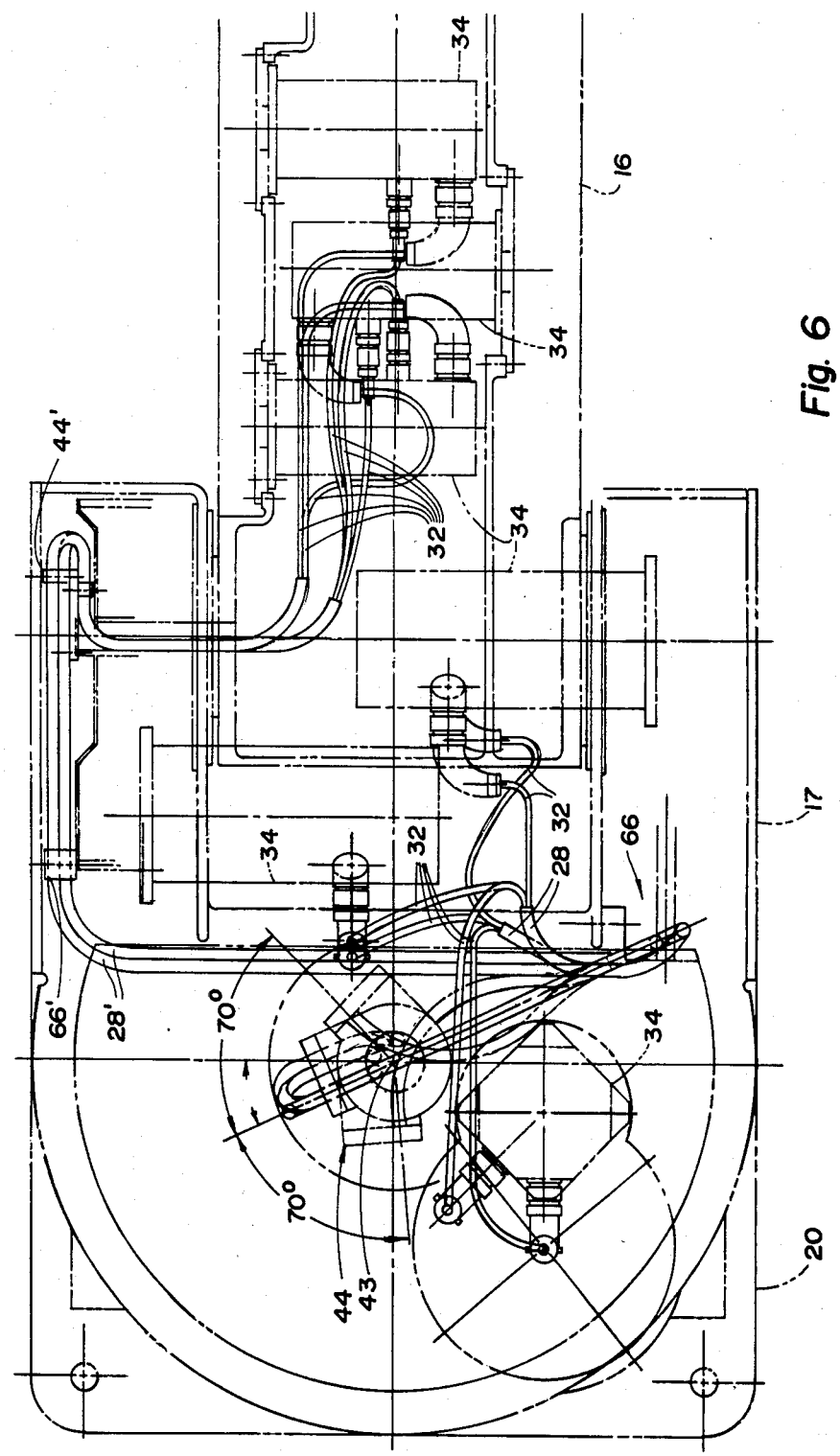
FIG. 6 is a top plan view, partially broken away, corresponding to the view of FIG. 2.

Referring now to FIG. 6 in combination with FIG. 2, there is illustrated the relative positions of the directing mechanism 44 and the retainer mechanism 66 which support the ribbon of cables 28 so they do not rub against each other during relative pivoting therebetween. The pivoting occurs about the pivotal axis 43 as illustrated by the phantom line positions of the directing mechanism 44 angularly disposed 70° on opposite sides of its solid line position. While the directing mechanism 44 is illustrated as rotating, it does not actually rotate but rather it is depicted as rotating since it is graphically easier to show it as moving, rather than showing the rotating structure as moving. Because the cables 28 are retained within both the retaining mechanism 66 and the directing mechanism 44, the effective length therebetween does not change during pivoting. Rather, the cables 28 flex as shown by their phantom line positions in FIG. 6.

This particular construction presents numerous advantages over the prior art. For example, rubbing between the cables 28 as well as rubbing between the cables 28 and other relatively sfationary and moving parts of the robot are substantially eliminated. Furthermore, the relatively limited flexing of the cables 28 does not require that the cables exhibit the extreme amount of flexibility required when such cables are alternately wound and unwound from a coil.

The above-described invention can also be utilized whenever a cable or cables are required to extend between other robot parts, one of which is rotatable relative to the other. For example, as shown in FIGS. 2 and 6, a pair of cables 28' are shown extending between a directing mechanism 44' and a retaining mechanism 66' in a similar fashion. The directing mechanism 44' and the retaining mechanism 66' operate in like fashion to prevent rubbing between the cables 28' and to allow the cable length between the robot parts to which the two mechanism are attached to remain unchanged during pivoting of one of the robot parts. In other words, when one of the parts to which the directing mechanism 44' is secured rotates relative to the retaining mechanism 66', the cables 28' flex as indicated by the phantom line positions as shown in FIG. 2. Again, this construction presents the same advantages that accrued through the use of the initially described directing mechanism 44 and the retaining mechanism 66.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. In a robot (10) comprising a base (18) and an arm assembly (14, 16) having a pivotal connection that pivotally supports the arm assembly on the base, the improvement comprising:

first and second robot parts (17, 20) mounted on said robot, the first robot part (17) being pivotable about a pivotal axis (43) relative to the second robot part;

at least one flexible cable (28);

first connecting means (66, 68) for fixedly connecting a first portion of the cable to the first robot part to rotate therewith about the pivotal axis; and second connecting means (40, 42, 44) for fixedly connecting a second portion of the cable to the second robot part; said second connecting means including directing means (44) for retaining and directing said cable in a direction substantially normal to and in the same plane as said pivotal axis in a substantially unflexed condition of said cable wherein the cable passes substantially through the pivotal axis and wherein said first connecting means includes retaining means (66) for retaining said cable so that said cable has an effective length between said directing and retaining means that does not change during pivoting of such first robot part, said directing and retaining means being disposed on opposite sides of the pivotal axis in a plane substantially normal to the pivotal axis and allowing said cable to flex a limited amount in a direction substantially normal to the pivotal axis during said pivoting and at least one of said directing and retaining means directing its respective retained portion of the cable substantially toward the pivotal axis during substantially the entire range of said pivoting motion.

2. In a robot (10) comprising a base (18) and an arm assembly (14, 16) having a pivotal connection that pivotally supports the arm assembly on the base, the improvement comprising:

first and second robot parts (17, 20) mounted on said robot, the first robot part (17) being pivotable about a pivotal axis (43) relative to the second robot part;

a plurality of flexible cables (28);

first connecting means (66, 68) for fixedly connecting first portions of the cables to the first robot part to rotate therewith about the pivotal axis; and second connecting means (40, 42, 44) for fixedly connecting second portions of the cables to the second robot part; said second connecting means includes directing means (44) for retaining and directing said cables in a direction substantially normal to and in the same plane as said pivotal axis in a substantially unflexed condition of said cables wherein the cables pass substantially through the pivotal axis and wherein said first connecting means includes retainer means (66) for retaining said cables at spaced locations to provide a ribbon of cables that do not rub against each other during pivoting of the first robot part, and so that said cables have an effective length between said directing and retaining means that does not change during pivoting of such first robot part, said directing and retaining means being disposed on opposite sides of the pivotal axis in a plane substantially normal to the pivotal axis and permitting said cables to flex a limited amount in a direction substantially normal to the pivotal axis during said pivoting and one of said directing and retaining means directing its respective retained portions of the cables substantially toward the pivotal axis during substantially the entire range of said pivoting.

3. The robot as claimed in claim 2 wherein said directing means includes a first holder spaced from said pivotal axis for receiving and retaining said cables therein and wherein said holder urges said cables towards said pivotal axis during pivoting.

4. The robot as claimed in claim 3 wherein said directing means further includes a second holder fixedly connected to said first holder for receiving and retaining said cables therein, said second holder directing said cables from a direction substantially parallel to said pivotal axis towards said first holder.

5. The robot as claimed in claim 2 wherein said retainer means (66) retains said cables at said spaced locations at a location spaced away from said pivotal axis.

6. The robot as claimed in claim 1 wherein said first part has a compartment (30) for housing the cable between said first and second connecting means.

7. The robot as claimed in claim 2 wherein said first part has a compartment (30) for housing the cables between the first and second connecting means.

* * * * *